United States Patent

Hayakawa

Patent Number: 5,304,289
Date of Patent: Apr. 19, 1994

[54] METHOD AND APPARATUS FOR TREATING WATER

[76] Inventor: Hideo Hayakawa, 2656-12, Moriya-ko, Moriya-machi, Kita-soma-gun, Ibaraki-ken, Japan

[21] Appl. No.: 35,962

[22] Filed: Mar. 23, 1993

[51] Int. Cl.⁵ .............................................. C02F 1/461
[52] U.S. Cl. ..................................... 204/149; 210/748
[58] Field of Search .......................... 204/149; 210/748

[56] References Cited

U.S. PATENT DOCUMENTS

| | | | |
|---|---|---|---|
| 3,637,482 | 1/1972 | Vajda | 204/228 |
| 4,865,747 | 9/1989 | Larson et al. | 210/695 |
| 4,963,268 | 10/1990 | Morse | 210/739 |
| 5,071,532 | 12/1991 | Taillet et al. | 204/228 |
| 5,183,512 | 2/1993 | Bragger | 131/1 |

FOREIGN PATENT DOCUMENTS 1-317592  12/1989  Japan.
3-258392  11/1991  Japan.

*Primary Examiner*—John Niebling
*Assistant Examiner*—Arun S. Phasge
*Attorney, Agent, or Firm*—Nikaido, Marmelstein, Murray & Oram

[57] ABSTRACT

A method for treating water and apparatus therefor. The water is treated by applying high-frequency sawtooth AC voltage to electrodes in the water. The apparatus have a DC voltage source; a low current-and-output voltage setting unit connected to the DC voltage source; an alternate switching circuit having first and second switching sections connected to the DC voltage source through the low current-and-output voltage setting unit; an alternate switching commander circuit receiving high frequency signals from a high-frequency oscillator to produce rectangular wave output signals for controlling the first and second switching sections, alternately; a capacitor connected between output terminals of the first and second switching sections to receive DC voltage through one of the first and second switching sections alternately, a polarity of the DC voltage being changed at a high frequency by the control signals from the alternate switching commander circuit, to produce saw-tooth voltage at high-frequency; and first and second electrodes connected to said capacitor and arranged in the water to be treated to give the high-frequency saw-tooth voltage to the water.

3 Claims, 1 Drawing Sheet

FIG. 1
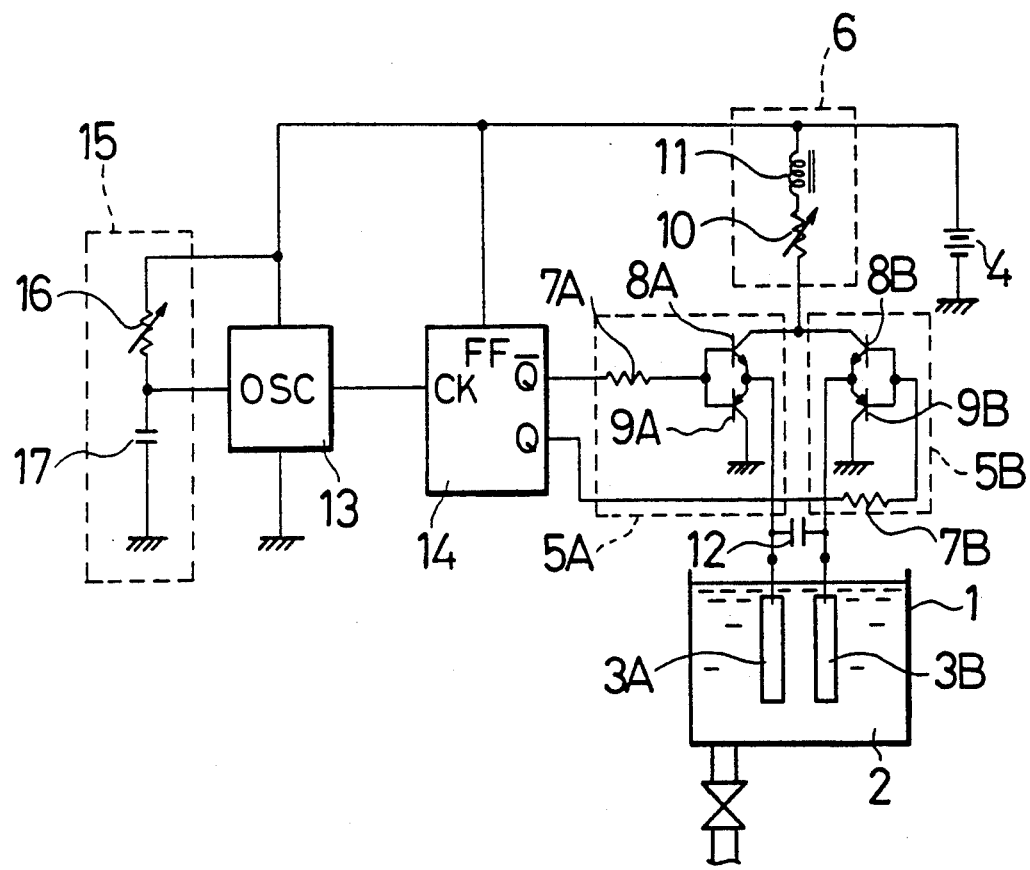
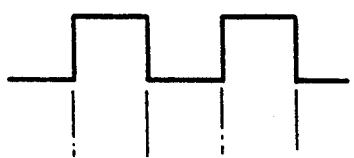
FIG. 2(A)
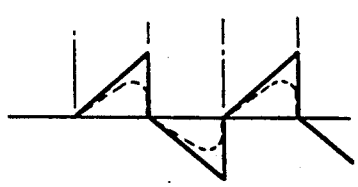
FIG. 2(B)

METHOD AND APPARATUS FOR TREATING WATER

BACKGROUND OF THE INVENTION

1. Field of the Invention

The present invention relates to a method and apparatus for treating water to change washing or cleaning capability and surface activity of water by giving electric energy thereto.

2. Related Arts

A conventional method or apparatus for changing the quality of water uses first and second electrodes soaked in water, and the water is given energy by applying DC voltage between these electrodes. Such a method or apparatus is shown, for instance in Japanese Patents (Hei) 1-317592(A) and (Hei) 3-258392(A).

The former discloses a method of obtaining acidic water from an anode chamber separated by a membrane from a cathode chamber in an electrolytic cell, to kill *Escherichia coli* and other bacteria. The latter discloses a method of sterilizing water, which comprising steps of introducing water to be treated into cathode and anode chambers in an electrolytic cell, and adding a predetermined amount of a hypochlorite salt in the anode chamber until pH of the hypochlorite salt containing solution in the chamber becomes 3 to 7, to attain a relatively high sterilization effect with a relatively low chlorine remaining concentration.

In conventional water treating methods, one of the electrodes is used as one with positive polarity, whereas the other with negative polarity, and therefore, the electrodes are liable to be covered with deposited substance caused by the electrolysis after a while, thereby preventing transfer of electricity therebetween. For preventing the deposition on electrodes, there is a way to periodically change the polarity of DC voltage to be applied for the electrodes.

With recourse to the periodic change of polarity in DC voltage, however, a single water treating apparatus cannot be adjusted to meet requirements for different water treatments. Also, the periodic change of polarity in DC voltage necessitates an extra polarity reversing circuit for a constant voltage source and a low current circuit, and accordingly increasing cost of the apparatus.

SUMMARY OF THE INVENTION

In view of the above, one object of the present invention is to provide a method for treating water with a reasonable cost, which shows an increased efficiency, and is capable of meeting requirements different due to a kind of water to be treated.

To attain this object, a water treating method according to the invention comprises a step of applying a high-frequency sawtooth AC voltage to water to be treated through first and second electrodes put in the water.

It is preferable to set the voltage and frequency in a range of 0.3-100 Vpp and 1-500 KHz, respectively. AC voltage in the audio-range is liable to give electrical shock to human living, and therefore the value of 1 KHz is selected as the lower limit of the frequency range because of no fear for electrical shock. 500 KHz is selected as the upper limit of the frequency range, because the water treating effect will descend suddenly over such a value. The voltage range is determined as appropriate from the angles of safety, cost and other factors.

The frequency and voltage can be selected within individual ranges to meet requirements for different applications of water to be treated, as for instance follows: the water treating apparatus works under conditions in the 27-33 KHz frequency range and in the 1-17 Vpp voltage range to remarkably decrease surface tension and increase solubilizing ability of water, which is suitable to use for washing purposes.

Another object of the invention is to provide an apparatus for carrying out the method as referred to.

According to the invention, this object can be attained by an apparatus for treating water, which comprises a DC voltage source; a low current-and-output voltage setting unit connected to said DC voltage source; an alternate switching circuit having first and second switching sections connected to said DC voltage source via said low current-and-output voltage setting unit; a high-frequency oscillator connected to said DC voltage source, said oscillator being equipped with frequency setting means; an alternate switching commander circuit responsive to high-frequency signals from said high-frequency oscillator for supplying a series of rectangular wave signals to the first and second switching sections in said alternate switching circuit alternately; a capacitor connected between output terminals of said first and second switching sections for receiving the DC voltage from said DC voltage source, but alternately reversed in polarity by the control signals fed from said alternate switching commander circuit to said first and second switching sections, to produce saw-tooth voltage at high-frequency; and first and second electrodes connected to said capacitor and to be arranged in water to be treated to give the high-frequency sawtooth AC voltage to the water.

The frequency and voltage of saw-tooth wave are selected in the 1 to 500 KHz frequency range and the 0.3 to 100 Vpp voltage range to be most appropriate for the purpose, and application of such a saw-tooth wave to the first and second electrodes will cause rise of the oxidation-reduction potential (hereinafter referred to as "ORP"), decrease of the surface tension of treated water, and decrease of the amount of dissolved oxygen in treated water, while preventing undesirable electrolysis of the water.

There is no means to determine what phenomena take place in water by applying such a high-frequency AC voltage thereto, and therefore, nobody can say whether or how the molecular structure of the water is changed, but as a matter of fact, the changing of water quality can be proved in terms of the change in value of ORP, surface tension and other physical characteristics of the treated water, and can be discerned by detergency test and other experiments. As for the taste of the treated water, the result of the taste test is liable to vary with individuals, and therefore, with a view for avoiding vagueness in data, such test results are shown nowhere except for appropriate cases.

In the water treating apparatus according to the invention, application of high-frequency signals from the high frequency oscillator to the alternate switching commander circuit causes appearance of rectangular switching command signals at the output terminal of the alternate switching commander circuit, which rectangular switching command signals are directed to the first and second switching sections alternately. As a result the DC voltage from the DC voltage source is reversed alternately in polarity to be applied across the saw-tooth wave generating capacitor, thus causing appearance of a saw-tooth AC voltage at a high-frequency to be applied for the first and second electrodes soaked in water.

The water treating apparatus can provide water of increased surface activity and detergency ability at a reduced cost, and can provide such treated water that can meet requirements for different and various applications.

Other objects and advantages of the present invention will be understood from the following description of a sole preferred embodiment which is shown in accompanying drawings.

BRIEF DESCRIPTION OF THE DRAWINGS

FIG. 1 is a wiring diagram of a water treating apparatus according to a preferred embodiment of the invention;

FIG. 2A shows a rectangular wave form appearing at output terminals of an alternate switching commander circuit; and FIG. 2B shows a high-frequency saw-tooth voltage wave form, showing how it works.

DETAILED DESCRIPTION OF THE PREFERRED EMBODIMENT

A water treating apparatus shown in FIG. 1 is designed to carry out a water treating method according to the present invention, and first and second electrodes 3A and 3B are put in water 2 to be treated, the water 2 being contained in a water tank 1 or flowing in a water channel 1. A dc voltage source 4 supplies 3 to 50 volts. An alternate switching circuit having first and second switching sections 5A and 5B is used along with an associated capacitor 12 for applying a high-frequency saw-tooth voltage to the first and second electrodes 3A and 3B in a low electric current. As shown, the first switching section 5A is made up by a resistor 7A and transistors 8A and 9A whereas the second switching section 5B is made up by a resistor 7B and transistors 8B and 9B. The alternate switching circuit is connected to the first and second electrodes 3A and 3B and to the dc voltage source 4 via a low current-and-output voltage setting unit 6, which is made up by a series connection of an output voltage setting resistor 10 and a delay coil 11, said series connection being connected between the voltage source 4 and the first and second switching sections 5A and 5B.

The capacitor 12 is used for providing a saw-tooth voltage wave, and is connected between output terminals of the first and second switching sections 5A and 5B.

A high-frequency oscillator 13 is equipped with frequency setting means 15, which is made up by a series connection of a frequency-setting variable resistor 16 and a frequency-setting variable capacitor 17. The high-frequency oscillator 13 is fed with electricity from the DC voltage source 4 to provide a high-frequency signal, and an alternate switching commander circuit 14 is a flip-flop circuit responsive to signals from the high-frequency oscillator 13 for supplying a series of rectangular wave signals to the first and second switching sections 5A and 5B alternately.

The operation of the water treating apparatus is described below. High-frequency signals ranging from 1 to 500 KHz are supplied from the high-frequency oscillator 13 to the alternate switching commander circuit 14, which directs rectangular output signals (FIG. 2A) to the first and second switching sections 5A and 5B alternately.

As a result, the first and second switching sections 5A and 5B turn "ON" alternately, thereby reversing the DC voltage from the DC voltage source 4 in polarity to be applied across the capacitor 12, thus providing a saw-tooth AC voltage wave at a high frequency (see a solid line in FIG. 2B), which saw-tooth voltage wave is directed to the first and second electrodes 3A and 3B.

In case of absence of the delay coil 11 in the low current-and-output voltage setting unit 6, a saw-tooth wave form as shown in a broken line in FIG. 2B will appear. The presence of the delay coil 11 in the low current-and-output voltage setting unit 6 will cause a sharp saw-tooth wave form to appear, and accordingly a high-voltage results.

Application of high-frequency saw-tooth voltage to the first and second electrodes 3A and 3B will effectively change quality of the water, without accompanying undesired electrolysis of the water 2, and will reduce electric current flowing in water. This may be attributable to appearance of electric dipoles, and is increasingly conspicuous with the increase of frequency. More or less electric current will flow in presence of polar molecules (metallic substances).

When an alternating current shall be supplied to water, in general, there is existence following relation.

$$i = I \times \sin \omega t,$$

wherein "i" is effective value; "I" is maximum value or amplitude (fixed value); "ω" is angular velocity or angular frequency and shown by 2n f; "f" is frequency; and "t" is period of time.

The relation shows that the effective current value increases as the frequency increases. The inventor has found, however, that the relation is applied only for the case that the frequency is below than 10 KHz and on the contrary thereto, the value suddenly decreases when the frequency exceeds 10 KHz, and accordingly causing no undesirable electrolysis of the water.

EXPERIMENTS

A stainless steel water tank (inner volume of 15 liters) was used. Two stainless steel plates (13×20 cm) as electrodes were oppositely arranged in the water tank with a distance of 20 cm. Water to be treated was poured into the water tank by 80% height thereof (about 12 liters). Numerous tests were carried out by setting a frequency and voltage in various values, but following 5 Examples (Groups) are shown, each of which groups shows similar results, when the frequency and voltage were set in the ranges described therein.

EXAMPLE 1

(1) Conditions:
   Water to be treated: City water; total hardness is 15; 20° C.,
   Frequency: 1-100 KHz,
   Voltage: 0.3-2 Vpp, and
   Treating period of time: 30 min.
(2) Results:
   (a) Surface tension (determined by using a 13φ platinum ring) decreased from 76 dyne/cm to 75-74 dyne/cm.

(b) Value of ORP increased from 508 mV to 568 mV (determined by an ORP meter, type TRX-90 marketed by Toko Kagaku Kenkyusho Co., Ltd.).
(e) Descaling ability was observed.
(d) Deodorizing ability was observed (Chlorine smell of city water disappeared).

EXAMPLE 2

(1) Conditions:
Water to be treated City water; total hardness is 15; 20° C.,
Frequency: 1–100 KHz,
Voltage: 2–13 Vpp, and
Treating period of time 30 min.
(2) Results:
(a) Surface tension decreased from 76 dyne/cm to 75–74 dyne/cm.
(b) Value of ORP increased from 508 mV to 570 mV.
(c) Descaling ability higher than that in Example 1 was observed.
(d) Deodorizing ability higher than that in Example 1 was observed.

EXAMPLE 3

(1) Conditions:
Water to be treated City water; total hardness is 15; 20° C.,
Frequency: 30–500 KHz,
Voltage: 15–20 Vpp, and
Treating period of time: 10 min.
(2) Results:
(a) Surface tension decreased from 76 dyne/cm to 73 dyne/cm.
(b) Value of ORP increased from 508 mV to 610 MV.
(c) Descaling ability higher than that in Example 2 was observed.
(d) Deodorizing ability higher than that in Example 2 was observed.

EXAMPLE 4

(1) Conditions:
Water to be treated: City water; total hardness is 15; 20° C.,
Frequency: 30–500 KHz,
Voltage: 20–100 Vpp, and
Treating period of time: 10 min.
(2) Results:
(a) Surface tension decreased from 76 dyne/cm to 71 dyne/em.
(b) Value of ORP increased from 508 mV to 638 mV.
(c) Descaling ability higher than that in Example 3 was observed.
(d) Deodorizing ability in same level with that in Example 3 was observed.
(e) When the treated water was used as a front window washing solution for automobiles, a fatty adhesive with dust causing a blur to the window glass can be effectively removed and adhesion thereof was restrained.

EXAMPLE 5

(1) Conditions:
Water to be treated: Distilled water at room temperature,
Frequency: 30+/−3 KHz,
Voltage: 10+/-31 3 Vpp, and
Treating period of time: 10 min.
(2) Results:
(a) Surface tension decreased from 72.5 dyne/cm to 52 dyne/cm.
(b) When distilled water heated at 80° C. was treated similar to the above, surface tension thereof further decreased to 40 dyne/cm.

Therefore, two electrodes were set in a booster tank of a tableware washing machine to carry out an experiment to find that tablewares were cleaned in a few minutes. The scale of calcium carbonate in piping of the machine starts to dissolve in a few minutes and the piping was cleaned in a few days.

The water in a swimming pool and a tank for supplying water for drinking and other purposes were treated according to the method of the invention under conditions of 30 KHz and 10 Vpp to find that the method is effective in descaling and derusting of water pipings and tank.

From numerous experiments, it was realized that the water treatment can be performed effectively on the conditions that: frequency is 30 KHz; voltage is a range of 5 to 10 Vpp; and electric current is 100$\mu$ A/cm. Therefore, the conditions allow use of a battery as a voltage source, and accordingly the size of apparatus can be made compact to remove a limitation in its installation. According to the method of the invention, further, water can be treated in a relatively short period of time, so that a lot of water can be treated per unit of time.

I claim:

1. A method of treating water, comprising the steps of:
providing a DC voltage source with a low current-and-output voltage setting unit connected thereto with an alternate switching circuit having first and second switching sections connected to the DC voltage source via the low current-and-output voltage setting unit, and a high-frequency oscillator connected to the DC voltage source, with the high-frequency oscillator being equipped with frequency setting means;
providing an alternate switching commander circuit responsive to high-frequency signals from the high-frequency oscillator, said commander circuit supplying a series of rectangular wave signals to control the first and second switching sections in the alternate switching circuit, with a capacitor connected between the output terminals of the first and second switching sections for receiving the DC voltage from the DC voltage source and alternately reversing polarity by control signals fed from the alternate switching commander circuit to the first and second switching sections, thereby producing saw-tooth voltage at high-frequency;
providing first and second electrodes, said first and second electrodes being disposed in water and connected to said capacitor; and
applying said saw-tooth AC voltage to said electrodes, said AC voltage ranging from 0.3 to 100 Vpp at a frequency ranging from 1 to 500 KHz.

2. A method as claimed in claim 1, wherein distilled water is treated by applying thereto said saw-tooth AC voltage ranging from 1 to 17 Vpp at a frequency ranging from 27 to 33 KHz to obtain water suitable for washing purposes.

3. A method as claimed in claim 1, wherein said distilled water is heated one.

* * * * *